United States Patent [19]
Genovese

[11] Patent Number: 6,123,294
[45] Date of Patent: Sep. 26, 2000

[54] AIRPLANE BARRIER NET

[75] Inventor: David E. Genovese, Peninsula, Ohio

[73] Assignee: SMR Technologies, Inc., Sharon Center, Ohio

[21] Appl. No.: 09/192,249

[22] Filed: Nov. 16, 1998

[51] Int. Cl.$^7$ ................................................. B64F 1/12
[52] U.S. Cl. ............................... 244/110 C; 244/118.1; 105/469
[58] Field of Search ................................. 244/118.1, 121

[56] References Cited

U.S. PATENT DOCUMENTS

| | | | |
|---|---|---|---|
| 3,738,599 | 6/1973 | Borehag | 244/110 C |
| 3,897,919 | 8/1975 | Weingarten | 244/118 R |
| 3,961,585 | 6/1976 | Brewer | 105/469 |
| 5,540,402 | 7/1996 | Carducci | 244/118.1 |
| 5,915,652 | 6/1999 | Caldwell et al. | 244/121 |

*Primary Examiner*—Peter M. Poon
*Assistant Examiner*—Francis T. Palo

*Attorney, Agent, or Firm*—Renner, Kenner, Greive, Bobak, Taylor & Weber

[57] ABSTRACT

A cargo barrier net (10) for retaining cargo within an aircraft fuselage in the event of a hard landing, crash landing, or in-flight turbulence is provided having a net structure made from Kevlar® or other materials having a high strength-to-weight ratio and end loops (20) made from straps of nylon or other materials having the ability to elongate and distend under an applied load. The end loops (20) attach the net structure to the tie-down frame within the aircraft's cargo compartment and, in the event of a hard landing or in-flight turbulence, the end loops (20) function to absorb forces placed upon the cargo barrier net (10) by elongating and distending under the shifting load. The cargo barrier net (10) also provides the advantage of being light weight due to the ability to use light weight, high strength materials such as Kevlar® for the net structure without compromising the needed ability for the cargo barrier net (10) to react to and compensate for shifting forces exerted upon the cargo barrier net (10) as cargo is jostled around during flight or landing.

14 Claims, 3 Drawing Sheets

AIRPLANE BARRIER NET

TECHNICAL FIELD

The present invention relates generally to restraining devices such as airplane cargo barrier nets placed between the cargo compartment of a plane and the bulkheads partitioning the pilot, passenger, and aircrew areas of the plane, to provide protection from substantial shifting of cargo which may result from turbulent flight, forced landings, or a crash. More particularly, the present invention relates to a nylon and Kevlar® composite barrier net assembly having main net elements of Kevlar® and end attachment loops of high strength nylon.

BACKGROUND ART

The air transport of cargo presents unique safety concerns in that forced landings, in-flight turbulence or a crash can cause the cargo within the plane to shift with incredible force creating a huge strain on the cargo restraints. If the restraints fail, the cargo may strike the bulkhead separating the cargo compartment from the pilot, passenger or aircrew compartments with a force substantial enough to cause a failure of the bulkhead thereby compounding the dilemma and endangering the safety of everyone on board.

Barrier nets are commonly used in aircraft to provide for some measure of energy absorption to hold cargo in place in the event of a hard landing or in-flight turbulence. These nets are placed between the cargo and the bulkheads which partition off the other compartments of the aircraft and are secured around their periphery to an aircraft frame at a series of tie-down points.

The cargo net material is usually either a nylon or polyester. Such materials are chosen because they elongate to distribute the applied loads evenly along the tie-down frame and provide a measure of energy absorption from shifting cargo. Stronger and lighter materials, such as Kevlar®, although desirable for their strength and weight, lack the elastic qualities of nylon and polyester and are not considered practical materials for cargo nets because they do not evenly distribute the applied load throughout the net. Furthermore, if such materials are used, high point loads can be developed causing the tie-down end terminations to be stressed beyond their limits.

With weight being an important consideration in aircraft construction, the present invention is aimed at providing a cargo net that utilizes the strength and light weight of Kevlar® as well as the elongation and load distribution properties of nylon.

DISCLOSURE OF THE INVENTION

It is an object of the present invention to provide a restraining device, preferably in the form of a barrier net, that is lighter in weight and greater in strength than conventional barrier nets.

It is another object of the present invention to provide a barrier net, as above, that can distend and react to applied loads thereby decreasing the stress on the tie-down points of the barrier net.

It is still another object of the present invention to provide a barrier net, as above, which is made from a plurality of interlaced straps made from a high strength-to-weight ratio material such as Kevlar®.

It is yet another object of the present invention, to provide a barrier net, as above, with end loops which are attached to each end of the strap, wherein the end loop material has high elongation properties.

These and other objects of the present invention, as well as the advantages thereof over existing prior art forms, which will become apparent from the description to follow, are accomplished by the improvements hereinafter described and claimed.

In general, a restraining device made in accordance with the present invention includes a net structure having a plurality of end terminations, the net structure being made from a first material. An end loop is attached to at least some of the plurality of end terminations. The end loops are made of a second material, such that the first material has a strength-to-weight ratio higher than the second material and the second material has elongation properties higher than the first material.

A preferred exemplary barrier net incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
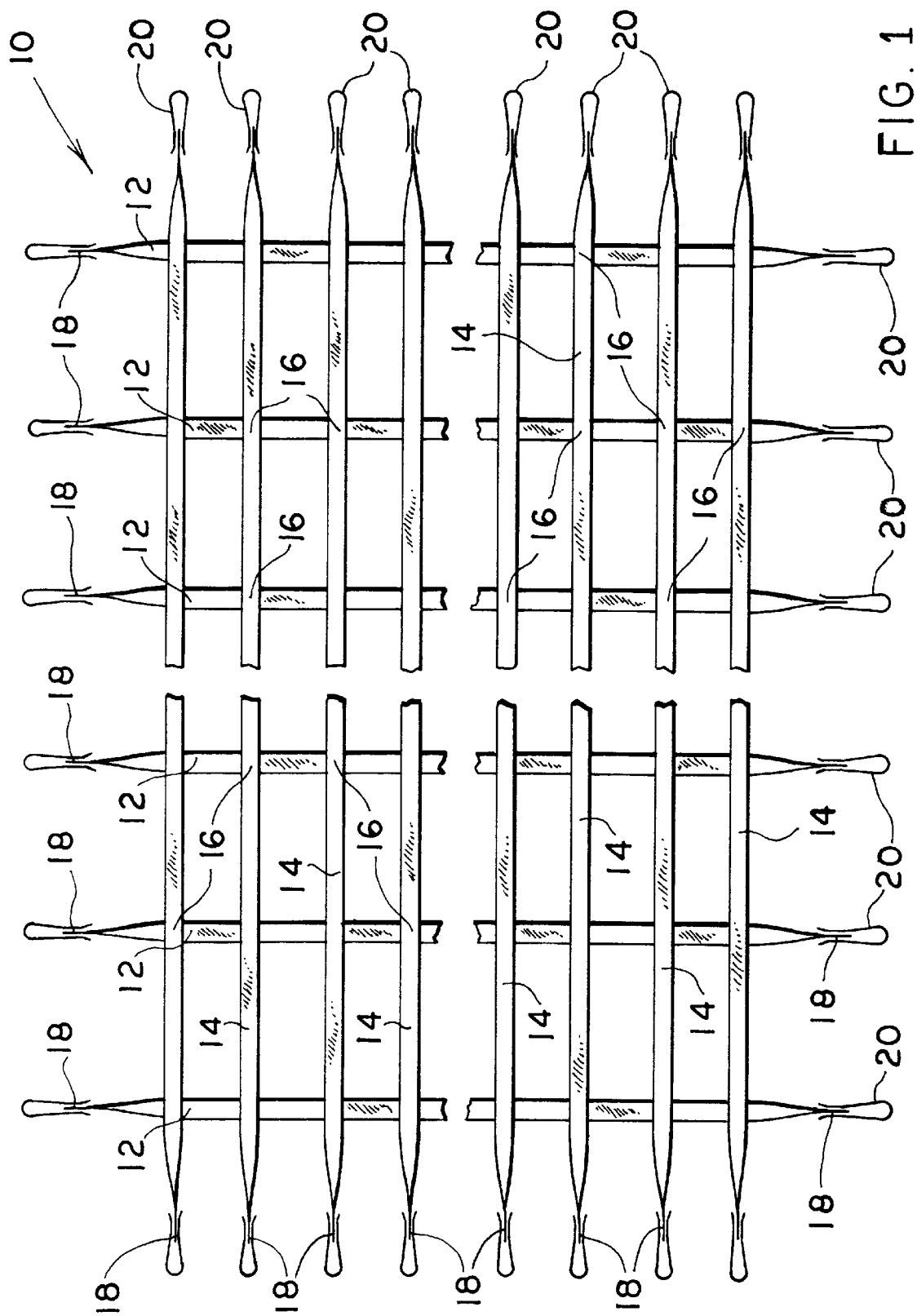
FIG. 1 somewhat schematically depicts a cargo barrier net made in accordance with the present invention and depicts multiple net straps overlapping to form the composite net of the present invention.

A restraining device particularly suited for use as a cargo barrier net made in accordance with the present invention is indicated generally by the numeral 10 in FIG. 1. Cargo barrier net 10 is formed by the interconnection of vertical straps 12 and horizontal straps 14. Typically, the interconnection of vertical straps 12 and horizontal straps 14 is orthogonal, however, they may be interconnected in any manner required by a particular load or tie-down frame for which cargo barrier net 10 is employed. Similarly, the symmetrical grid pattern depicted in FIGS. 1 and 2 may also be adjusted as required by a particular load or tie-down frame. Thus, the present invention is not limited to a cargo net having a symmetrical structure wherein vertical and horizontal straps 12,14 forming the cargo net intersect at right angles.

Figure 2:
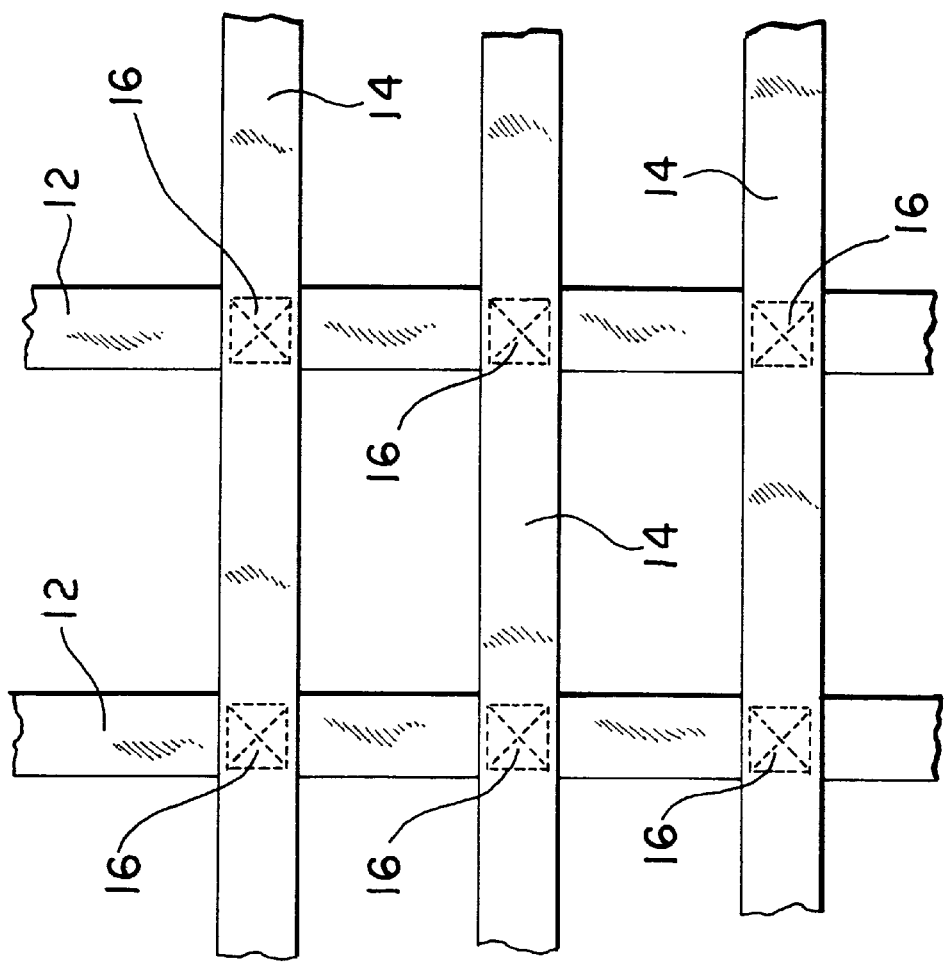
FIG. 2 is an enlarged view of the intersection of the individual straps of the cargo net of FIG. 1.

Referring more particularly to FIG. 2, it can be seen that vertical straps 12 and horizontal straps 14 overlap at intersections 16 where they may be interconnected by various known means such as stitching, riveting, fusing, stapling, and the like. As shown in FIG. 2, the preferred embodiment of the present invention utilizes a box stitch to connect vertical straps 12 and horizontal straps 14 at intersections 16, however, the present invention is not limited thereto.

The grid-like structure of cargo barrier net 10 may be formed from vertical straps 12 and horizontal straps 14 in a variety of ways. Straps 12 and 14 may be woven so that adjacent intersections 16 alternate between having vertical strap 12 overlaid on horizontal strap 14 and horizontal strap 14 overlaid on vertical strap 12. Also, the grid-like structure can be formed simply by having all vertical straps 12 overlaid on top of horizontal straps 14 and attached at intersections 16, or vice versa. The desired end result, as can be readily appreciated in FIG. 1, is that vertical straps 12 and horizontal straps 14 form a net structure having a periphery defined by a plurality of end terminations 18. Indeed, multiple variations exist in creating the net structure of cargo barrier net 10, and the present invention is not limited to any specific construction thereof.

For purposes of the preferred embodiment, horizontal straps 14 and vertical straps 12 are strips of Kevlar®. Although Kevlar® is disclosed as a preferred material for straps 12, 14, it should be appreciated that other materials having a high strength-to-weight ratio also fall within the scope of the present invention.

Figure 3:
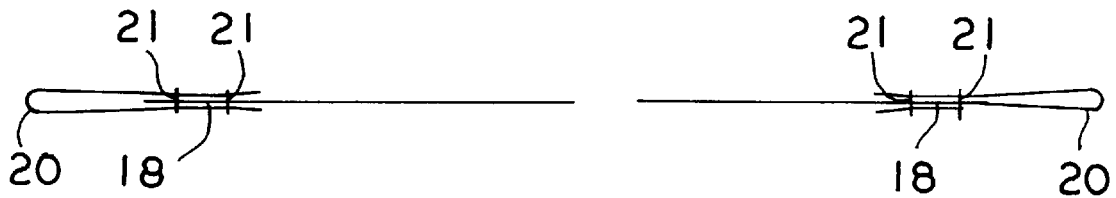
FIG. 3 is a side view of an individual composite strap of the cargo net of the present invention having single-ply end loops attached thereto.

Referring now to FIG. 3, it can be seen that attached to each end termination 18 are end loops 20. End loops 20 provide the means for attaching cargo barrier net 10 to an aircraft frame in the cargo compartment of an aircraft. While loops 20 may be attached to all end terminations 18, thereby connecting the entire periphery of cargo barrier net 10 to appropriate frames, it is contemplated that only some of the end terminations 18 may need loops 20. Moreover, depending on the frames of a particular aircraft, only the ends 18 of horizontal straps 14 or only the ends 18 of vertical straps 12 may be provided with end loops 20.

Preferably, end loops 20 are formed from straps of a material which is able to elongate and provide for some measure of energy absorption as a function of distention under load. As such, end loops 20 provide cargo barrier net 10 with the desired ability to distend and react to applied loads thereby decreasing the stress on the tie-down points within the cargo compartment and help to safely secure cargo during forced landings, in-flight turbulence or airplane crashes. In the preferred embodiment of the present invention, end loops 20 are nylon straps, however, other materials, such as polyester, which provide the desired elongation and distention properties to cargo barrier net 10, may be employed.

With reference to FIG. 3, it can be seen that end loop 20 is formed by overlapping one side of end termination 18 with a strap of nylon or similar material and looping this strap of material back in on itself to overlap the other side of end termination 18. The strap of nylon or similar material is then secured in place at this area of overlap by stitching 21, thereby forming end loop 20 which can be attached to a frame in a cargo compartment. While stitching has been disclosed as the preferred means for forming and securing end loop 20 to end termination 18, it should be appreciated that other means, such as fusing, riveting, stapling and the like, also fall within the scope of this invention.

Figure 4:
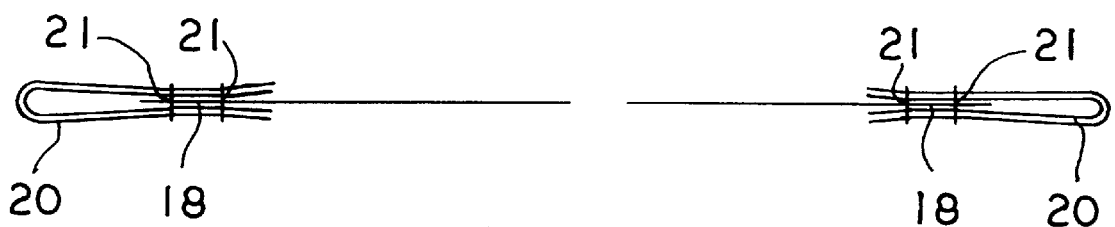
FIG. 4 is a side view of an individual composite strap of the cargo net of the present invention having multiple-ply end loops attached thereto.

Referring now to FIG. 4, it can be seen that the present invention also contemplates the use of multiple plies of nylon or other elongation material for end loops 20. End loops 20 are formed as described above but multiple strips overlap the end terminations 18 and are stitched thereto.

Figure 5:
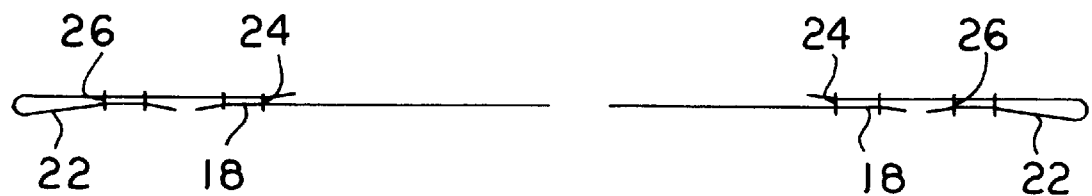
FIG. 5 is a side view showing an alternate means for forming and attaching a single-ply end loop to individual composite straps.
Figure 6:
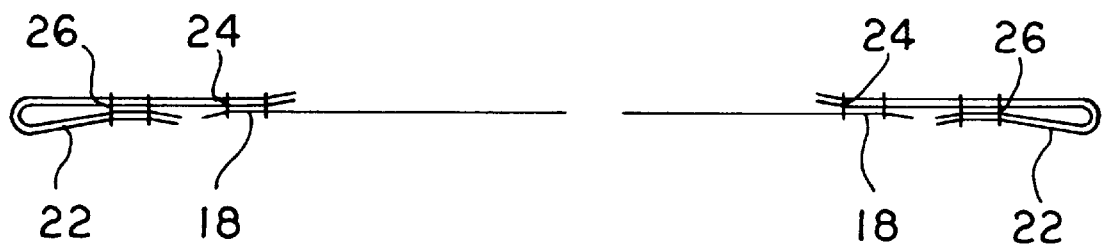
FIG. 6 is a side view showing an alternative means for forming and attaching a multiple-ply end loop to individual composite straps.

In FIG. 5, an alternative end loop formation is shown. To form this alternate end loop 22, nylon or similar material is placed to overlap an end of an end termination 18 and is held in place by stitching 24. The material extending beyond the end termination 18 is then looped back on itself and stitching 26 attaches the material to itself to create alternate end loop 22. As shown in FIG. 6, this end loop configuration can also be practiced using multiple plies of nylon. It should be appreciated that, while stitching has been disclosed as the preferred manner in which to form alternative end loop 22, the present invention is not limited thereto and alternative end loop 22 may be formed by other means, such as fusing, stapling, riveting and the like.

To evaluate the effectiveness of the composite cargo barrier net 10, a basic Kevlar® net element was constructed and tested using an Instrong-type tensile tester. The basic Kevlar® construction pulled 4700 pounds with a 8.3 percent elongation at a crosshead speed of 0.2 inch per minute and 4736 pounds with a 7.9 percent elongation at a crosshead speed of 20.0 inch per minute. Using the Kevlar® as the main net element and a single-ply of nylon looped and sewed to each end, the construction pulled 2150 pounds with a 16 percent elongation at a crosshead speed of 0.2 inch per minute and 2100 pounds with 16 percent elongation at a crosshead speed of 20.0 inch per minute. Using two piles of nylon for the loops on each end yielded 3100 pounds at 26 percent elongation at 0.2 inch per minute crosshead speed and 3370 pounds at 26 percent elongation at 20.0 inch per minute crosshead speed. By increasing the strength of the end loops of nylon by adding additional plies and the like to more closely equal the strength of the Kevlar®, the net 10 should yield higher loads and elongation, while being much lighter than a wholly nylon construction.

Testing reveals that Kevlar® exhibits a strength-to-weight ratio of about 2.9 to 1 when compared to nylon, and about 3.0 to 1 when compared to polyester. With respect to elongation properties, Kevlar® exhibits between about 2 percent to about 4 percent depending upon force and speed of forces applied thereto, while nylon and polyester exhibits elongation properties between about 14 percent to about 18 percent with the same factors.

Thus, composite cargo barrier net 10 is formed, having a net structure formed by vertical straps 12 and horizontal straps 14 made of a material having a high strength-to-weight ratio and end loops 20 connected to straps 12 and 14 made from a material having the ability to elongate and provide for energy absorption. Preferably, straps 12 and 14 have a strength-to-weight ratio higher than that of end loops 20 while end loops 20 have more substantial energy absorption properties than straps 12 and 14. When in use, the high strength-to-weight ratio material of straps 12 and 14 will provide strength while the energy absorbing material forming end loops 20 will provide composite cargo barrier net 10 with the ability to distend and react to applied loads to decrease stress on the tie-down points within the cargo compartment. This combination provides advantages over known barrier nets in that weaker materials having energy absorption properties are not utilized for the main structure of the barrier net which is advantageously formed from high strength, low weight material. Thus, the composite cargo barrier net of the present invention adds less weight to the aircraft while still providing the aircraft with safety measures to protect from shifting cargo.

In view of the foregoing, it should be evident that an airplane barrier net constructed as described herein, accomplishes the objects of the invention and otherwise substantially improves the art. While a preferred embodiment of the invention has been presented and described in detail, the invention is not limited thereto or thereby. Accordingly, for an appreciation of the true scope and breadth of the invention, reference should be made to the following claims.

What is claimed is:

1. A restraining device comprising a net structure having a plurality of end terminations, said net structure made from a first material; and an end loop attached to at least some of said plurality of end terminations, said end loops made of a second material, wherein said first material has a strength-to-weight ratio higher than said second material and said second material has elongation properties higher than said first material.

2. A restraining device according to claim 1 wherein said net structure includes a first plurality of straps oriented in a first direction, a second plurality of straps oriented in a second direction different than said first direction, and means for connecting said first plurality of straps to said second plurality of straps at intersections thereof.

3. A restraining device according to claim 2 wherein said first plurality of straps and said second plurality of straps are interconnected at said intersections by stitching.

4. A restraining device according to claim 3 wherein said intersections of said first and second plurality of straps are formed by weaving said first and second plurality of straps.

5. A restraining device according to claim 3 wherein said intersections of said first and second plurality of straps are formed by overlaying said first plurality of straps on one side of said second plurality of straps.

6. A restraining device according to claim 1 wherein said end loops are attached to said end terminations along the periphery of said net structure by stitching.

7. A restraining device according to claim 1 wherein said end loops are formed on said end terminations by receiving each said end termination between ends of said end loop material.

8. A restraining device according to claim 1 wherein said end loops are formed on said end terminations by attaching one end of said end loops to said first material and an opposite end of said end loops to itself.

9. A restraining device according to claim 1 wherein said first material is Kevlar®.

10. A restraining device according to claim 1 wherein said second material is nylon.

11. A restraining device according to claim 1 wherein said second material is a polyester.

12. A restraining device according to claim 1 wherein said first material has a strength-to-weight ratio of between about 2.9 to about 3.0 when compared to said second material.

13. A restraining device according to claim 1 wherein said second material has elongation properties of between about 14 percent to about 18 percent.

14. A restraining device according to claim 1 wherein said second material has elongation properties of between about 14 percent to about 18 percent and said first material has elongation properties of between about 2 percent to about 10 percent.

* * * * *